United States Patent [19]
Koczo et al.

[11] Patent Number: 5,846,454
[45] Date of Patent: Dec. 8, 1998

[54] WATER DISPERSIBLE ANTIFOAM CONCENTRATES

[75] Inventors: Kalman Koczo, Suffern; Joan Kircher, Yorktown Heights, both of N.Y.

[73] Assignee: OSi Specialties, Inc., Greenwich, Conn.

[21] Appl. No.: 862,221

[22] Filed: May 23, 1997

[51] Int. Cl.[6] .................................................. B01D 19/04
[52] U.S. Cl. ........................................ 252/358; 252/321
[58] Field of Search ...................................... 252/321, 358

[56] References Cited

U.S. PATENT DOCUMENTS

| | | | |
|---|---|---|---|
| 3,560,401 | 2/1971 | O'Hara et al. | 252/358 |
| 4,076,648 | 2/1978 | Rosen | 252/358 |
| 4,436,647 | 3/1984 | Pirson et al. | 252/358 |
| 4,477,371 | 10/1984 | Huber et al. | 252/358 |
| 4,584,125 | 4/1986 | Griswold et al. | 252/358 |
| 4,690,713 | 9/1987 | Terae et al. | 252/358 |
| 4,919,843 | 4/1990 | Innertsberger et al. | 252/358 |
| 5,080,828 | 1/1992 | Terae | 252/358 |
| 5,458,905 | 10/1995 | Heagle | 252/321 |

*Primary Examiner*—Richard D. Lovering
*Assistant Examiner*—Daniel Metzmaier
*Attorney, Agent, or Firm*—Edward K. Welch, II; Andrew S. Reiskind; Timothy X. Witkowski

[57] ABSTRACT

Disclosed is a water dispersible antifoam concentrate comprising a polydiorganosiloxane component;

fine solid particles of inorganic oxide, bearing on the surface thereof a polydiorganosiloxane component;

a nonionic emulsifier component;

a thickener component; and optionally, water, at up to 5 wt. % of the concentrate if present therein;

optionally, but preferably, solvent, and preservative or biocide.

The antifoam concentrate can be dispersed with a pre-set amount of water, using moderate shear, to obtain a complete, storage stable, low cost antifoam emulsion, which can be used in agricultural, food, textile, waste water, liquid detergent and general industrial applications.

11 Claims, No Drawings

WATER DISPERSIBLE ANTIFOAM CONCENTRATES

FIELD OF THE INVENTION

The present invention relates to water dispersible antifoam concentrates.

BACKGROUND OF THE INVENTION

It is well-known in the art that very effective antifoaming agents, so-called antifoam compounds, can be made from non-polar oils and fine solid particles ("fillers"). The non-polar oil is frequently polydimethylsiloxane, and the filler is silica which is made hydrophobic by adding a basic catalyst, such as alkali silanolate or alkali hydroxide, and heating to 100°–300° C. for several hours, as described, for example in U.S. Pat. Nos. 3,235,509 and 3,560,401.

In aqueous applications the antifoam compounds, however, are very difficult to use because the oil based compound is very difficult to disperse evenly into the aqueous foamant.

To solve this problem, the antifoam compound can be emulsified as an oil-in-water emulsion using emulsifiers, dispersing agents, and various other additives. To obtain storage stability for a prolonged time (typically for 0.5–2 years), thickeners and stabilizers are added to the emulsion. The advantage of the emulsion form is that the antifoam emulsion can be uniformly dispersed into an aqueous phase using only slight or moderate mixing. The disadvantage of this form, however, is that these antifoam emulsions typically contain only 10–40 % solids ("actives"); the rest is water that causes a significant additional cost in material processing, packaging and transportation.

To avoid the problem of the high water content of the antifoam emulsion, Rosen (U.S. Pat. No. 4,076,648) and later Huber et al. (U.S. Pat. No. 4,477,371) invented self-dispersible, non-aqueous antifoam compositions containing lipophilic nonionic surfactant dispersed in a polydiorganosiloxane antifoam. These compositions can be directly dispersed into water without additional emulsification. Similar compositions are described by Griswold et al. (U.S. Pat. No. 4,584,125 ). Antifoam formulations easily dispersible in liquid detergents are described in U.S. Pat. No. 4,983,316, and European Patent Nos. 638,346 and 635,564. Antifoam compositions which are readily water-dispersible are described in U.S. Pat. Nos. 4,024,072 and 4,405,490. Pirson et al. (U.S. Pat. No. 4,436,647) described self-emulsifiable antifoam compositions containing polyorganosiloxane, filler, anionic dispersant and a water soluble cellulose derivative. By diluting these compositions with water, antifoam emulsions with improved storage stability can be obtained.

The shortcoming of the self-dispersible compounds is that the diluted compound is not storage stable; it creams or settles within several hours or a couple of days. If the user wants to store these emulsions he has to add stabilizer and thickener to them.

SUMMARY OF THE INVENTION

The objective of the present invention is a water dispersible antifoam concentrate composition which contains all the components necessary for an antifoam emulsion, such as antifoam compound, emulsifier, thickener, and biocide, except water. When the user disperses this antifoam concentrate into water he obtains a complete, effective, low cost and storage stable antifoam emulsion.

This invention comprises water dispersible antifoam compositions for providing foam control primarily in aqueous media. The compositions comprise a polydiorganosiloxane component;

fine solid particles (filler), preferably silica, bearing on the surface thereof a polydiorganosiloxane component;

a non-ionic emulsifier, preferably silicone and/or organic based;

a thickener component, preferably polyacrylate or polysaccharide based, optionally, but preferably, a polyalkylene oxide component, preferably polypropylene glycol, as solvent;

optionally, but preferably, a preservative or biocide; and optionally, water, at low content if present.

Another aspect of the present invention is a process for making a water dispersible antifoam concentrate, comprising in a first step blending the polydiorganosiloxane, the filler and a catalyst component which is basic material, preferably alkali hydroxide or alkali silanolate, and then reacting them at a temperature of 50°–300° C. for several hours, so that some of the polydiorganosiloxane becomes bound to the filler particle surfaces; and then, preferably following cooling to ambient temperature, blending this product with the other components of the concentrate to obtain the dispersible antifoam concentrate.

A water dispersible antifoam concentrate formulation has to be designed for a given dilution, which can be between 2–30 fold (2-fold, 3-fold, 1 0-fold etc.), in order to obtain a stable antifoam emulsion. If the customer dilutes the given concentrate in the given ratio with water, using only moderate shear, he obtains an effective, low cost and storage stable antifoam emulsion, without the need of adding any additional component, such as thickener or preservative. The thickener is added to stabilize the dispersed antifoam emulsion. The thickener does not thicken the antifoam concentrate because it contains very little or no water. The thickener becomes active only when the concentrate is dispersed into water by the customer. The ratio of dilution of the concentrate is set by the concentration of the thickener and preservative components.

The composition described here can be used in a wide range of applications, including but not limited to agricultural, food, textile, waste water, liquid detergent and general industrial applications.

DETAILED DESCRIPTION OF THE INVENTION

The polydiorganosiloxane used in the present invention is at least one polymer component with units of the general formula: $R^1 R^2 SiO$, where $R^1$ and $R^2$ denote organic radicals. The end groups of the polymer can be hydroxyl or methyl. Methyl groups are preferred as both $R^1$ and $R^2$ (so that the polydiorganosiloxane is polydimethylsiloxane) in this invention, but the organic groups can be any other organic radicals, such as ethyl, propyl, butyl or phenyl groups and their combinations as well. The polydiorganosiloxane component will usually be comprised of a mixture of such polymer molecules. The kinematic viscosity of the polydiorganosiloxane component should be in the 50 to 2,000,000 centistokes range, preferably between 200 and 200,000 centistokes. The concentration of the polydiorganosiloxane component is preferably about 10 to 80% by weight of the concentrate.

The finely divided solid particulate component, frequently called "filler", is one or more than one solid inorganic oxide. Silica is preferred as the particulate material. The silica can be fumed or precipitated and in either hydrophilic or hydrophobized form. While silica is preferred in this invention, fine particles of other materials, such as $Al_2O_3$, $TiO_2$, $ZrO_2$ or their combinations with each other or with silica can be used. The filler particles should have a specific surface area of about 50 to 300 $m^2/g$. The filler can be either hydrophilic, that is, untreated, or hydrophobized. The concentration of the filler particles in the antifoam concentrate should be set so that the ratio of the total amount of the polydiorganosiloxane present in the concentrate to the amount of the filler particles is about 10:1 to 200:1.

The polydiorganosiloxane component and the filler component are combined so that some of the polydiorganosiloxane becomes bound to the surface of the filler particles. The term "bound" is used herein to mean that polydiorganosiloxane is present on, and remains on, the particle surfaces during and following the preparation of the concentrate according to the present invention. The behavior of the polydiorganosiloxane on the particle surfaces is consistent with its being covalently bound thereto, but the actual nature of the attachment of the polydiorganosiloxane to the particle surfaces is not critical so long as the attachment exists.

The attachment of the polydiorganosiloxane to the particle surfaces is preferably effected with the aid of a catalyst for reaction of these components. As reaction catalyst at least one basic material may be used. The preferred catalyst is alkali hydroxide, such as KOH, NaOH etc., or alkali silanolate, such as potassium-silanolate or sodium-silanolate. Other basic materials, such as alkaline earth metal oxides, hydroxides and silanolates; monoalkyl, dialkyl, and trialkyl amines; and tetraalkylammonium hydroxides and silanolates can also be used as catalyst. Typical examples of these catalysts include calcium, magnesium or strontium oxide, hydroxide or silanolate and their combinations. Each alkyl group in an amine catalyst typically can be a $C_1$ to $C_{16}$ alkyl group, such as methyl, ethyl, propyl, butyl, decyl, dodecyl, or hexadecyl, or one of the alkyl groups can be replaced by a phenyl group. The catalyst is preferably used in an effective amount on the order of 0.1% to 10% by weight of the combined amount of polydiorganosiloxane and filler present, and preferably 0.5% to 5% by weight thereof.

It is also possible to include in the composition of this invention a polyalkylene oxide component, which is preferably polypropylene glycol, as solvent. The concentration of this component should be about 5–50% of the final composition. The molecular weight of the polypropylene glycol is about 500–10,000 Dalton, preferably about 500–2000 Dalton.

At least one nonionic emulsifier component is also necessary to the antifoam concentrate composition. The concentration of the emulsifier should be about 1 to 15% by weight of the final antifoam concentrate. The function of this component is to help emulsify the antifoam components when the antifoam concentrate is dispersed into water. Another function of this component is to stabilize the dispersed antifoam emulsion drops from coalescence. Another possible role of the silicone based emulsifier is that it enhances the antifoaming action of the other components.

The nonionic emulsifier component is comprised of one or more than one nonionic emulsifier. Preferably the nonionic emulsifier is comprised of silicone based and/or organic based surfactants.

The silicone based emulsifiers which can be used in this invention preferably include at least one block copolymer of polydimethylsiloxane and one or a combination of several polyalkylene oxides. The molecular weight of the polydimethylsiloxane part of the block copolymer should be about 300–100,000 Dalton. The polyalkylene oxide part of the silicone based block copolymer comprises preferably polyethylene oxide and polypropylene oxide. The molecular weight of the polyalkylene oxide blocks in the silicone based emulsifier component is about 100–40,000 Dalton. The ratio of the polyethylene and polypropylene oxide blocks in the nonionic block copolymer is preferably about 0–60%, respectively.

At least one organic, non-silicone based, emulsifier can also be used instead of, or in addition to, the silicone based emulsifier described above. Polyoxyethylene-alkyl ethers (alcohol ethoxylates), ethylene oxide/propylene oxide copolymers, fatty acid alkyl esters, glyceryl-lacto esters of fatty acids, such as glyceryl lactooleate, glyceryl fatty acid mono- and di-esters, such as glyceryl monostearate, glyceryl monooleate, glyceryl monolaurate or glyceryl 5-hydroxydecanoate, lactylated fatty acid esters of glycerol and propylene glycol, polyglycerol esters of fatty acids, fatty acid monoglyceridyl citrates, fatty acid polyoxyethylene esters with 10–40 moles of ethylene oxide, such as polyoxyethylene 40 monostearate, polyoxyethylene dioleate, polysorbate 20, polysorbate 60, polysorbate 65, polysorbate 80, propylene glycol mono- and diesters of fatty acids, fatty acid sorbitan mono- and di-esters, such as sorbitan monooleate or sorbitan monostearate, sucrose fatty acid esters, diacetyl tartaric acid esters of monoglycerides, acetic acid esters of monoglycerides, and lecithin can be used as organic type emulsifiers.

It is preferred in this invention to combine at least two emulsifiers, one with a low HLB (2–6) and another with a high HLB (6–16). Low HLB emulsifiers are, for example, propylene glycol monostearate, glyceryl monooleate, sorbitan monostearate, sorbitan tristearate or glyceryl lactopalmitate. High HLB emulsifiers are, for example, glyceryl monolaurate, polyoxyethylene (40) monostearate, polysorbate 60, polysorbate 65, polysorbate 80 or decaglycerol monooleate.

In order to stabilize the antifoam emulsion that can be obtained from the antifoam concentrate of the present invention, at least one thickener component should be present. Useful thickener components in this invention are preferably either polyacrylate and/or polysaccharide based. Polyacrylate based thickeners are large molecular weight, cross-linked polymer resins of acrylic acid and its derivatives. These materials are hydrophilic, water-swellable and extremely effective thickeners in aqueous or polar solvent based liquids. Typical commercial polyacrylate based thickeners which are useful include the "Carbopol" products of B. F. Goodrich and the ACUSOLS of Rohm and Haas. These products are available in powdered form, such as Carbopol 934, 940, 941, 980, Carbopol ETD 2020, 2050, 2623, and Carbopol EZ-2, or as water based emulsions, such as ACUSOL 810, 820, 830, 823 or 842. The polyacrylic acid based thickeners work effectively only if they are neutralized with a basic material. If neutralized to about pH 6–9 the polyacrylic acid based thickeners give high viscosity and gel structure to aqueous or polar solvent based liquids which can stabilize emulsions. Based on these requirements a neutralizing agent should be added to the water dispersible antifoam concentrate in a concentration which is necessary to set the pH of the dispersed antifoam emulsion close to neutral (pH 6 to 9), if a polyacrylate based thickener is used. As neutralizing agent various types of basic materials can be used. Typical useful neutralizing agents are alkali hydroxides, carbonates, hydrogen carbonates, acetates or alkaline earth oxides, hydroxides, carbonates, acetates or any other alkali or alkaline earth salts which can neutralize acrylic acid. Organic amine bases including monoalkyl, dialkyl, trialkyl amines, tetraalkylammonium hydroxides, triethanolamine (TEA), diisopropanolamine (DIPA), aminomethyl propanol, tromethamine and tetrahydroxypropyl ethylenediamine can also be used as neutralizing agents. The neutralizing agent should be added in concentrated (5–50%) aqueous solution or in pure liquid or powdered form to the antifoam concentrate. The thickening acid and the neutralizer components do not react in the antifoam concentrate because it contains very little or no water or polar solvents. The reaction occurs and the thickener forms only in situ when the concentrate is dispersed into water by the customer. During dispersing in water the polyacrylate based thickener and the neutralizer hydrate and then react and form an emulsion with increased viscosity and thus high stability.

A polysaccharide type thickener can also be used instead of or in addition to the polyacrylate type thickener in the antifoam compositions in this invention. Several polysaccharides can be utilized as thickener. It is preferred in this invention to use at least one natural or artificial polysaccharide gum if a polysaccharide type thickener is used. Typical polysaccharide gums which can be used are gum arabic, agar, alginates, carrageenans and their salts, guar gum, guaran, locust bean gum, gum tragacanth, gellan gum, ramsan gum, dextran or xanthan gum and their combinations.

The antifoam concentrate compositions are, however, not limited to the use of polysaccharide gums. Other polysaccharide type thickeners, such as starches or cellulose derivatives can also be used, as described below. Starches from various sources and starch derivatives, such as hydroxyethylstarch, starch phosphate esters, or starch acetates can also be used as the polysaccharide type thickener. Cellulose derivatives, such as carboxymethyl cellulose and its sodium salt, methyl-, ethyl-, hydroxyethyl-, hydroxypropyl-, hydroxypropyl methyl- or hydroxyethyl methyl-cellulose or cellulose acetate are also usable in the composition described in this invention. If only polysaccharide and no polyacrylate based thickener is used then no neutralizer is necessary and no chemical reaction takes place during the dispersion of the concentrate in water.

The viscosity of the dispersed antifoam emulsion should be about 300–4000 centistokes. The viscosity of the emulsion strongly depends on the concentration of the thickener in the dispersed antifoam emulsion, that is, on the thickener concentration in the antifoam concentrate and on how much water was used to disperse the antifoam concentrate. If the dilution ratio is too high (too much water was added) the viscosity of the emulsion will be very low and the emulsion will be unstable. If the dilution ratio is too low (not enough water was added) the emulsion will be too viscous and it will be difficult to handle. Because of this, a water dispersible antifoam concentrate formulation has to be designed for a given dilution, which can be between 2 to 30-fold (2-fold, 3-fold, 10-fold etc.) in order to obtain a stable antifoam emulsion with optimum viscosity. Here, "N-fold" is used to mean that 1 part by weight of antifoam concentrate is dispersed into N-1 parts by weight of water to obtain N parts of antifoam emulsion. The thickener concentration for a given dilution can be determined by experiments. If, in the preliminary experiments, the thickener concentration that gave the required viscosity is x % then, for a y-fold dilution the thickener concentration of the antifoam concentrate should be about (x times y) %. Thus, for example, if the experiments showed that a stable emulsion can be obtained with 0.08% thickener concentration, then a water dispersible antifoam concentrate with 5-fold dispersibility should contain about 5×0.08=0.4% thickener, and the equivalent amount of neutralizing agent. The thickener concentration of the compositions in the concentrates of the present invention are typically about 0.1–15%.

Preservative can also be present in the composition of the present invention in order to prevent microbial growth in the antifoam concentrate and the dispersed antifoam emulsion during storage. Most of the commercial preservative or biocide products are usable for preparing an antifoam concentrate. Examples of such products are Ucarcide 250 (glutaraldehyde) from Union Carbide, Kathon CG/ICP from Rohm and Haas. If the antifoam concentrate is to be used in food applications then any food preservative, such as acetic acid, sorbic acid, lactic acid, propionic acid, benzoic acid and their salts or parabens and their combinations can be used, in accordance with the respective food regulations.

The concentration of the preservative (biocide) depends on the dilutability of the antifoam concentrate in a manner similar to that of the thickener concentration above. If the antifoam concentrate is designed for x-fold dilution and z % biocide is necessary to stop bacterial growth in the antifoam emulsion, then, (x times z) % biocide should be blended into the antifoam concentrate.

It is an important feature of this invention that water is either excluded from the concentrates of the present invention, or water is added only to a low concentration to the water dispersible antifoam concentrate composition, for example as a solvent of the neutralizer base (in the case of polyacrylate based thickener) or the preservative. The water concentration of the total concentrate should not exceed about 5%. The reason for the low water concentration is to minimize the cost and time of material processing and handling and to avoid excessive action of the thickener.

The preparation of the water dispersible antifoam concentrate is a two-step process. In the first step of the preparation an antifoam compound is made by blending and reacting the polydiorganosiloxane, particulate, and catalyst components. A possible way of addition is starting with the polydiorganosiloxane, then adding the fine solid particles under intensive mixing, and finally blending the catalyst, if any. The sequence of addition is, however, not critical. After a homogeneous mixture is obtained it is heated to 50°–300° C. for several hours. During heating the blend can be mixed. At the heating step the filler particles react with the polydiorganosiloxane with the possible assistance of the catalyst, and the antifoam compound forms. As a result, the surface of the particles becomes hydrophobic which strongly enhances the antifoaming ability of the mixture. After the reaction the antifoam compound is cooled to ambient temperature and stored until further use.

In the second step of the antifoam concentrate preparation, the antifoam compound made in the first step is blended with the other components under intensive mixing, at 20°–100° C. temperature. The sequence of addition of the various components can be the following.

1.) Starting with the antifoam compound, the polyalkylene oxide (if any), the emulsifier, the thickener, the neutralizing agent (if any) and the preservative are added, in this sequence.
2.) The antifoam compound, then the emulsifier, the thickener, the neutralizing agent (if any), the polyalkylene oxide (if any) and the preservative are added, in this sequence.
3.) Same as in 2.), but the thickener and the neutralizer (if any) are dispersed into polypropylene oxide in a separate container before adding to the mixture.
4.) Starting with the polyalkylene oxide (if any), the thickener, the neutralizing agent (if any), the emulsifier, the antifoam compound and finally the preservative are added, in this sequence.

It is important to blend the mixture well at every addition, before the next component is added.

TEST PROCEDURES

Various lab tests were used to check the quality of the water dispersible antifoam concentrate. The water dispersibility of the concentrate was tested in laboratory scale by using a 400 ml beaker and a "Lightnin" mixer equipped with a cowles type blade. The concentrate was gradually added into water in the given ratio for which the concentrate was designed. For example, a 5-fold dilutable concentrate was tested by adding 1 part of antifoam concentrate into 4 parts of water. As the diluting water, a standardized running water was used, which contained 36 ppm $CaSO_4 2H_2O$, 32.3 ppm $MgCl_2$ and 106 ppm NaCl. The water and the diluted emulsion were mixed using moderate speed, at 800 rpm, for 30 min.

Similar tests were done in larger scale, in a 30-gallon container using a drum mixer with swinging blender (4 inch maximum diameter) operated at 700–800 rpm. The amount of emulsion prepared in these tests was 200–500 g in the lab scale experiments and 8 gallons in the larger scale experiments. After the dilution the homogeneity, the stability and the viscosity of the emulsion were tested.

The homogeneity of the diluted antifoam emulsion was tested by visual observation. The emulsion was further diluted to about 1% solid concentration with running water, in a 30 ml glass vial and the diluted emulsion was observed in transparent light. The quality of the preparation was acceptable if no particles or particle aggregates larger than a few tenths of a millimeter could be observed.

The stability of the diluted emulsions was tested at elevated temperature. The emulsion samples in a 2 oz jar were stored in an oven at 50° C. and their homogeneity was observed regularly. A sample was accepted as stable if no phase separation, such as water syneresis, oil separation or creaming, occurred for at least one month.

The viscosity of the diluted antifoam emulsion samples obtained from the antifoam concentrate preparations was measured with a Brookfield LV viscometer, using spindle #3 and 30 rpm speed. A sample was accepted if the viscosity was in the 500–4000 centipoise range, preferably between 800 and 2500 centipoise.

The antifoam concentrates described here can be used in a wide range of applications including but not limited to agricultural, food, textile, waste water, liquid detergent and general industrial applications.

EXAMPLES

All the examples here describe the preparation and test results of water dispersible antifoam concentrates designed for 10-fold dilutability. Concentration given as "parts" means parts per weight. The size of the preparations described below was 200–500 g.

In all examples below, the emulsifier was a polyethylene oxide-polypropylene oxide block copolymer with polydimethylsiloxane of about 50,000 Dalton molecular weight, and 20% polyethylene oxide and 30% polypropylene oxide content. In all the examples the silicone based emulsifier was diluted with a polypropylene oxide which had about 700 Dalton molecular weight, and butyl and hydrogen endgroups, respectively. The mixture contained 20% of this diluent.

EXAMPLE 1.
Preparation of antifoam compound 1.: Polydimethylsiloxane (94 parts) with 500 centistokes viscosity was mixed in a glass flask with 5 parts of hydrophobic, fumed silica with about 260 $m^2/g$ surface area using a laboratory mixer at high speed. Then 1 part of potassium silanolate was blended. The mixture was heated up to 150° C., and kept at this temperature for 2 hours. Then the reaction mixture was cooled to ambient temperature and stored until further use.
Thirty parts of polypropylene glycol with about 2000 Dalton molecular weight was filled into a beaker which was equipped with a laboratory mixer. The liquid was mixed with a cowles type blade of 2 inches diameter. Two parts of Carbopol ETD-2623 and 2.1 parts of potassium carbonate powder (−325 mesh) were dispersed into the polypropylene glycol, using high rpm (1000 rpm) in about 20 min. About 0.5 parts of KATHON CG/ICP (Rohm and Haas) was added under continuous stirring. Then 5 parts of emulsifier mixture was added gradually and the mixture was stirred for another 10 min. Antifoam compound 1 (20.1 parts), 20.1 part of polydimethylsiloxane with 500 centistokes viscosity and then 8 parts of polydimethylsiloxane with 100,000 centistokes viscosity were added gradually, in this sequence, at high blending rate (1000 rpm) and the mixture was stirred for another 15 min.

EXAMPLE 2.
Preparation of antifoam compound 2: One part of antifoam compound 1 (see above) was blended with two parts of polydimethylsiloxane (500 centistokes) using a laboratory mixer, at 1000 rpm, for about 30 min.

EXAMPLE 2.1.
Antifoam compound 2. (59.3 parts) above was filled into a beaker which was stirred as in Example 1. Five parts of emulsifier (see above) was blended into the compound. After blending the mixture for about 10 min, 2.4 parts of potassium carbonate powder was added gradually and mixed for another 10 min. Then, 41.6 parts of polypropylene glycol with about 2000 Dalton molecular weight was added dropwise. Twenty parts of Carbopol ETD-2623 was dispersed in 80 parts of polypropylene glycol with about 2000 Dalton molecular weight in a separate beaker, at high blending rate, for about 30 min. This dispersion was added (11.5 parts) to the blend dropwise. Finally, 1 part of glutaraldehyde biocide (Ucarcide 250 from Union Carbide) was blended into the concentrate and it was mixed for another 15 min.

EXAMPLE 2.2.
Antifoam compound 2. (84.4 parts) above was filled into a beaker which was stirred as in Example 1., at 800 rpm rate. Carbopol ETD-2020 powder (0.6 parts) was sprinkled into the liquid and then dispersed in about 5 min using 1000 rpm rate. Then 9.5 parts of 10% NaOH and 0.5 parts of KATHON CG/ICP (form Rohm and Haas) were added dropwise. Five parts of emulsifier (see above) was blended gradually and the mixtures was stirred for another 10 min at 1000 rpm rate.

EXAMPLE 2.3.
Antifoam compound 2. (88.9 parts) above was filled into a beaker which was stirred as in Example 1. About 0.6 parts of Carbopol ETD-2020 powder was sprinkled into the liquid and then dispersed in about 5 min using 1000 rpm rate. Five parts of Triethanolamine and 0.5 parts of KATHON CG/ICP (form Rohm and Haas) were added dropwise. Five parts of emulsifier (see above) was blended gradually and the mixture was stirred for another 10 min.

EXAMPLE 2.4.
Thirty parts of polypropylene glycol with about 2000 Dalton molecular weight was added first and mixed with a cowles blade as in Example 1. Two parts of Carbopol ETD-2623 and 2.1 parts of potassium carbonate powder (−325 mesh) were dispersed into the polypropylene glycol, using high rpm (1000 rpm) in about 20 min. KATHON CG/ICP (0.5 parts; form Rohm and Haas) was added under continuous stirring. Then 5 parts of emulsifier mixture was added gradually and the mixture was stirred for another 10 min.

Antifoam compound 2. (60.4 parts) above was added gradually at higher blending rate (1200 rpm) and the mixture was stirred for another 15 min.

EXAMPLE 2.5.

Thirty parts of polypropylene glycol with about 2000 Dalton molecular weight was added first and mixed with a cowles blade as in Example 1. Two parts of Carbopol ETD-2623 and 2.1 parts of potassium carbonate powder (−325 mesh) were dispersed into the polypropylene glycol, using high rpm (1000 rpm) in about 20 min. KATHON CG/ICP (0.5 parts, form Rohm and Haas) was added under continuous stirring. Then 5 parts of emulsifier mixture was added gradually and the mixture was stirred for another 10 min. Antifoam compound 2. (52.4 parts) and then 8 parts of polydimethylsiloxane with 100,000 centistokes viscosity were added gradually at high blending rate ( 1500 rpm) and the mixture was stirred for another 15 min.

EXAMPLE 2.6.

Twenty parts of polypropylene glycol with about 2000 Dalton molecular weight was added first and mixed with a cowles blade as in Example 1. Carbopol EZ-2 (0.6 parts) was dispersed into the polypropylene glycol, using high rpm (1000 rpm) in about 15 min. About 0.75 parts of 20% NaOH and 0.5 parts of KATHON CG/ICP (form Rohm and Haas) were added under continuous stirring. Then 5 parts of emulsifier mixture was added gradually and the mixture was stirred for another 10 min. Antifoam compound 2. (73.15 parts) above was added gradually under stirring.

EXAMPLE 2.7.

Twenty parts of polypropylene glycol with about 2000 Dalton molecular weight was added first and mixed with a cowles blade as in Example 1. Carbopol EZ-2 (0.6 parts) was dispersed into the polypropylene glycol, using high rpm (1000 rpm) in about 15 min. Morpholine (2.5 parts) and 0.5 parts of KATHON CG/ICP (form Rohm and Haas) were added under continuous stirring. Then 5 parts of emulsifier mixture was added gradually and the mixture was stirred for another 10 min. Antifoam compound 2. (71.4 parts) was added gradually under stirring.

Test results:
Viscous, pourable, white liquid formed in all examples. One part of concentrate was mixed into 9 parts of standardized running water with the method described above. The dispersed emulsions were uniform, no lumps or aggregates could be observed. All emulsions had high antifoaming efficiency and no separation could be observed for at least 3 months in any of them.

The table below shows the viscosity of the antifoam emulsions obtained for the antifoam concentrates in the above examples.

| Example | Viscosity of dispersed antifoam emulsion in cPs |
|---|---|
| 1. | 1360 |
| 2.1. | 2540 |
| 2.2. | 1050 |
| 2.3. | 950 |
| 2.4. | 1750 |
| 2.5. | 1600 |
| 2.6. | 1800 |
| 2.7. | 1300 |

What is claimed is:

1. A water dispersible antifoam concentrate which comprises
   (a) polydiorganosiloxane;
   (b) fine solid particles of inorganic oxide, bearing on the surface thereof a polydiorganosiloxane component;
   wherein the total amount of polydiorganosiloxane present in components (a) and (b) comprises 10 wt. % to 80 wt. % of the concentrate and the weight ratio of the total amount of polydiorganosiloxane present in components (a) and (b) to the amount of said inorganic oxide is 10:1 to 200:1;
   (c) a nonionic emulsifier component which comprises 0.1 wt. % to 15 wt. % of said concentrate;
   (d) a thickener component which comprises 0.1 wt. % to 15 wt. % of said concentrate;
   (e) a polypropylene glycol solvent component of a molecular weight of about 500 to about 10,000 Daltons which comprises 5 wt. % to 50 wt. % of said concentrate, and
   optionally, water, at up to 5 wt. % of the concentrate if present therein, which concentrate can be dispersed in water to obtain a storage stable antifoam emulsion.

2. An antifoam composition in accordance with claim 1, wherein the polydiorganosiloxane component comprises at least one polydimethylsiloxane with a viscosity of 50 to 2,000,000 centistokes.

3. An antifoam composition in accordance with claim 2, wherein the polydiorganosiloxane component comprises at least one polydimethylsiloxane with a viscosity of 200 to 200,000 centistokes.

4. An antifoam composition in accordance with claim 1, wherein said particles are silica having a specific surface area of 50 to 300 $m^2/g$.

5. An antifoam composition in accordance with claim 1, wherein the emulsifier comprises at least one copolymer of polydimethylsiloxane and polyalkylene oxide.

6. An antifoam composition in accordance with claim 5, wherein the emulsifier comprises at least one copolymer of polydimethylsiloxane with a molecular weight of 300 to 100,000 Dalton and polyalkylene oxide.

7. An antifoam composition in accordance with claim 6, wherein the polyalkylene oxide is present in said copolymer as blocks of polyethylene oxide and polypropylene oxide with molecular weights of 100–40,000 Dalton and the weight ratio of the polyethylene oxide blocks to the polypropylene oxide blocks is up to 60%.

8. An antifoam composition in accordance with claim 1, wherein the emulsifier component comprises an emulsifier having an HLB of 3–6 and an emulsifier having an HLB of 6–16.

9. An antifoam composition in accordance with claim 1, wherein the thickener component comprises at least one polysaccharide gum.

10. An antifoam composition in accordance with claim 1, wherein the thickener component comprises at least one polyacrylate based component and at least one neutralizer.

11. An antifoam composition in accordance with claim 1, further comprising at least one preservative or biocide component.

* * * * *